United States Patent [19]

Oogita et al.

[11] Patent Number: 4,751,150
[45] Date of Patent: Jun. 14, 1988

[54] PAPER BATTERY

[75] Inventors: Yoshinori Oogita; Kazuhiro Nakao, both of Nara, Japan

[73] Assignee: Sharp Kabushiki Kaisha, Osaka, Japan

[21] Appl. No.: 38,201

[22] Filed: Apr. 14, 1987

[30] Foreign Application Priority Data

Apr. 15, 1986 [JP] Japan .............................. 61-56959[U]

[51] Int. Cl.⁴ ......................... H01M 2/30; H01M 2/34
[52] U.S. Cl. ......................................... 429/1; 429/162; 429/179
[58] Field of Search ............... 429/152, 153, 151, 178, 429/179, 162, 1, 124

[56] References Cited

U.S. PATENT DOCUMENTS 4,361,633 11/1982 Nel et al. ............................. 429/152
4,623,598 11/1986 Waki et al. ........................... 429/178

FOREIGN PATENT DOCUMENTS 0216440 10/1985 Japan .................................. 429/162

Primary Examiner—Donald L. Walton
Attorney, Agent, or Firm—Flehr, Hohbach, Test, Albritton & Herbert

[57] ABSTRACT

A paper battery for connection to terminals protruding in same direction has positive and negative electrode plates joined together by a sealing agent therebetween formed with an insulating sheet. A hole penetrating one of the electrode plates and the insulating sheet to reach the other electrode plate and another hole penetrating the other of the electrode plates to reach the insulating sheet are provided such that not only is the battery connected properly to the terminals when it is inserted correctly but also a short circuit will be avoided even if the paper battery is inserted in upside-down direction.

6 Claims, 3 Drawing Sheets

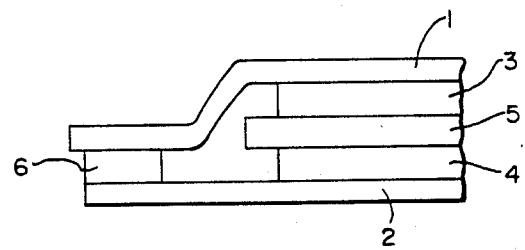
FIG.—1
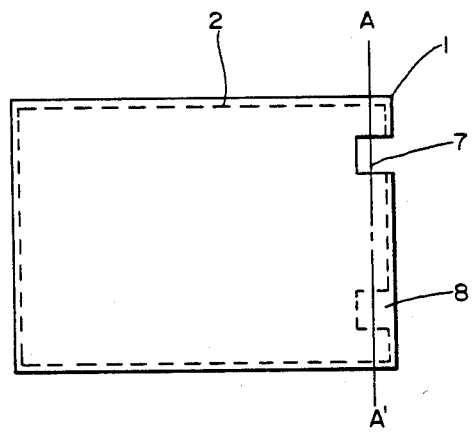
FIG.—2
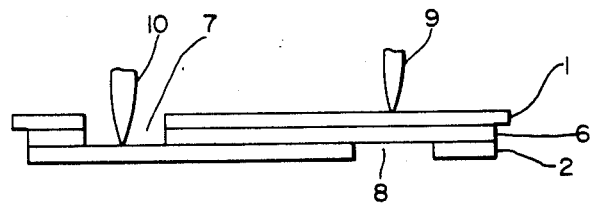
FIG.—3

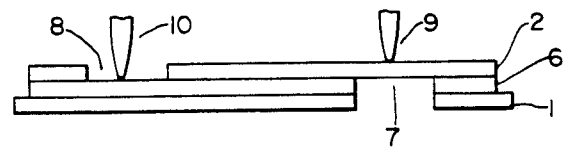
FIG.—4
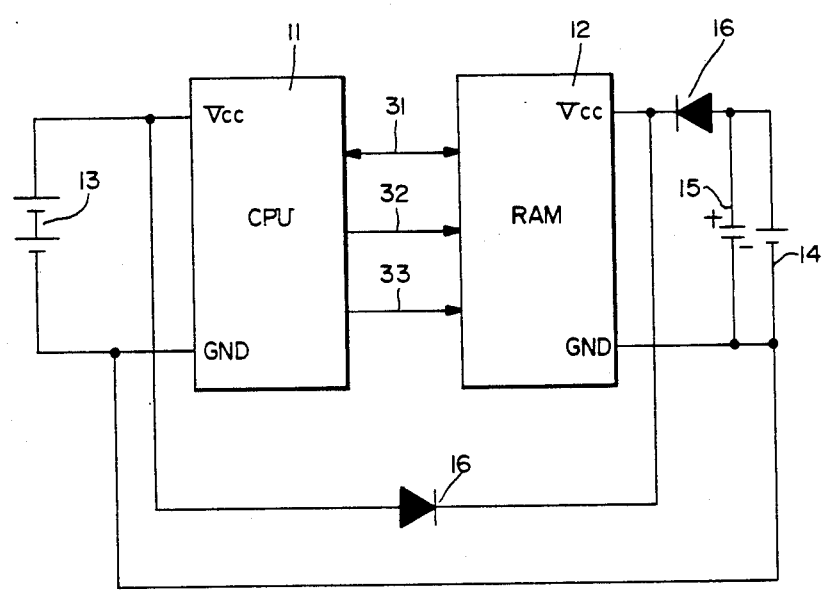
FIG.—5

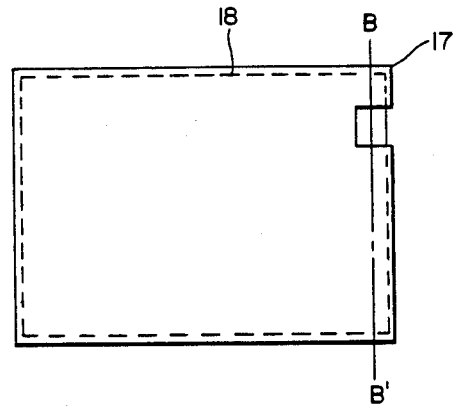
(PRIOR ART)
FIG.—6
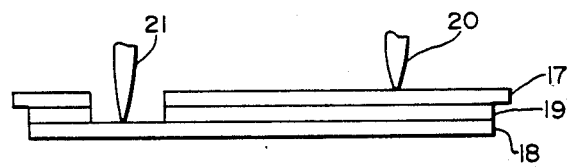
(PRIOR ART)
FIG.—7
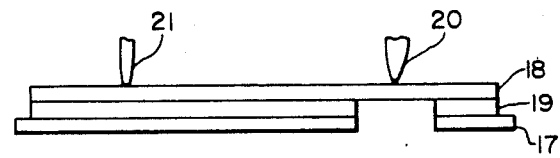
(PRIOR ART)
FIG.—8

PAPER BATTERY

BACKGROUND OF THE INVENTION

This invention relates to a paper battery and more particularly to a paper battery of the type having positive and negative electrode plates respectively contacting positive and negative electrodes protruding in the same direction and a sealing agent on these plates for sticking them together.

There have been electronic devices such as IC cards that incorporate a thin paper battery as a backup power source. As shown in FIG. 5, such a device is typically composed of a central processing unit (CPU) 11 and a random access memory device (RAM) 12, using main batteries 13 as the principal source of power and a paper battery 14 which serves as a backup power source. Numerals 31, 32 and 33 represent a data bus, an address bus and a control bus, respectively. Numerals 15 and 16 represent respectively a backup capacitor and diodes for preventing a current from flowing in the wrong direction.

The paper battery 14 is structured, as shown in FIGS. 6 and 7, with a positive electrode plate 17, a negative electrode plate 18 and a sealing agent 19 which is sandwiched therebetween and serves to hold them together. The plates 17 and 18 are so structured as to be in contact respectively with a positive terminal 20 and a negative terminal 21 protruding in the same direction with respect to each other.

FIG. 7 shows a sectional view when the paper battery 14 has been set correctly in the circuit shown in FIG. 5. It happens not infrequently, however, that the user inserts the paper battery 14 in upside-down direction. If the paper battery 14 is thus inserted erroneously as shown in FIG. 8, both the positive and negative terminals 20 and 21 come into contact with the negative electrode plate 18 such that there results a short circuit between the grounding terminal GND and the source voltage terminal $V_{CC}$ of the random access memory 12 as well as between the positive and negative terminals of the aforementioned backup capacitor 15. As a result, data stored in the random access memory 12 are destroyed.

SUMMARY OF THE INVENTION

It is therefore an object of the present invention to eliminate the aforementioned disadvantage of the prior art paper battery. The above and other objects of the present invention are achieved by providing a paper battery of a new type having positive and negative electrode plates sandwiching therebetween a sealing agent which is formed with an insulating sheet such that the positive and negative electrode plates respectively touch the positive and negative terminals protruding in the same direction with respect to each other if the paper battery is correctly inserted but either of the two terminals will come into contact with the aforementioned insulating sheet if the paper battery is erroneously inserted in upside-down direction, the terminals remaining insulated from each other.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a schematic drawing of a sectional view of a paper battery embodying the present invention, FIG. 2 is a plan veiw of a paper battery embodying the present invention, FIG. 3 is a sectional view taken along the line A-A' of FIG. 2 when the paper battery is correctly inserted, FIG. 4 is a sectional view taken along the line A-A' of FIG. 2 when the paper battery is inserted in upside-down direction, FIG. 5 is a circuit diagram of an electronic device incorporating a paper battery, FIG. 6 is a plan view of a prior art paper battery, FIG. 7 is a sectional view taken along the line B-B' of FIG. 6 when the paper battery is correctly inserted, and FIG. 8 is a sectional view taken along the line B-B' of FIG. 6 when the paper battery is inserted in upside-down direction.

DETAILED DESCRIPTION OF THE INVENTION

With reference to FIG. 1 which is a sectional view of a thin paper type lithium battery embodying the present invention, the battery comprises a positive electrode plate 1 electrically connected to a positive electrode material 3 such as $MnO_2$ and a negative electrode plate 2 electrically connected to a negative electrode material 4 such as metallic lithium. The two electrode materials 3 and 4 are electrically insulated from each other by a separator 5 sandwiched therebetween. The two electrode plates 1 and 2 are extended in one direction for making connections to terminals (not shown in FIG. 1) and held together at their extended sections by means of a sealing agent 6 sandwiched therebetween. The sealing agent 6 is formed with an insulating sheet. As shown in FIG. 2, the paper battery of the present invention is characterized as having in the aforementioned extended section a first indentation 7 in both the positive electrode plate 1 and the insulating sheet 6 and a second indentation 8 in the negative electrode plate 2 such that the indentations 7 and 8 are separated from each other.

FIG. 3 shows the connection of this paper battery with positive and negative terminals 9 and 10, say, of a device shown in FIG. 5 when the paper battery is correctly inserted. The terminals 9 and 10 are assumed to be like those shown in FIG. 7 (at 20 and 21), protruding in the same direction such that the positive terminal 9 touches the positive electrode plate 1 and the negative terminal 10 touches the negative electrode plate 2 by penetrating the positive electrode plate 1 and the sealing agent 6 through the first indentation 7. If the paper battery is insered correctly as shown in FIG. 3, therefore, connection is correct and the source voltage of the paper battery is properly applied to the device through the terminals 9 and 10.

FIG. 4, wherein components which are identical to those shown in FIG. 3 are indicated by the same numerals, shows the connection of the paper battery with the terminals 9 and 10 when it is inserted in upside-down direction. In this situation, the positive terminal 9 touches the negative electrode plate 2 but the negative terminal 10 passes through the second indentation 8 and comes into contact with the insulating sheet 6. In other words, the positive and negative terminals are electricaly separated by the insulating sheet 6. Thus, even if the paper battery is inserted in upside-down direction, there is no short circuit of the backup capacitor and the destruction of the chip and the wasteful draining of the batteries can be prevented.

The foregoing description of a preferred embodiment of the invention has been presented for purposes of illustration and description. It is not intended to be exhaustive or to limit the invention to the precise form disclosed, and many modifications and variations are possible in light of the above teaching. For example, the paper battery shown in FIGS. 2–4 is so structured that the negative terminal 10 touches the insulating sheet 6 when the paper battery is inserted in upside-down direction, but a paper battery of the present invention may be alternatively so structured that the positive terminal 9 touches the insulating sheet 6 when the paper battery is inserted upside-down direction. Although the indentations 7 and 8 are provided along an edge of the extended portions of the electrode plates 1 and 2 as best shown in FIG. 2, these indentations 7 and 8 may be replaced by holes, the first indentation 7 being replaced by a first hole through the positive electrode plate 1 and the insulating sheet 6, reaching the negative electrode plate 2 and the second indentation 8 being replaced by a second hole through the negative electrode plate 2 reaching the insulating sheet 6. In other words, expressions "indentations" and "holes" as used above and in the claims below are intended to be given broadest interpretations.

What is claimed is:

1. In a paper battery comprising positive and negative electrode plates adapted to respectively contact positive and negative terminals which protrude in a same direction, and a sealing agent between said electrode plates, said electrode plates being stuck together through said sealing agent, the improvement wherein said sealing agent comprises an insulating sheet, said positive electrode plate and said insulating sheet have a first hole formed therethrough, said first hole reaching said negative electrode plate, said negative electrode plate has a second hole formed therethrough, said second hole reaching said insulating sheet such that when said negative terminal is passed through said first hole, said negative terminal contacts said negative electrode plate and said positive terminal contacts said positive electrode plate, and that when said negative terminal is passed through said second hole, said negative terminal contacts said insulating sheet and is insulated from said positive terminal.

2. The paper battery of claim 1 further comprising a positive electrode material attached to said positive electrode plate, a negative electrode material attached to said negative electrode plate, and an insulating separator disposed between said positive and negative electrode materials.

3. The paper battery of claim 2 wherein said electrode material is $MnO_2$ and said negative electrode material is metallic lithium.

4. In a paper battery comprising positive and negative electrode plates adapted to respectively contact positive and negative terminals which protrude in a same direction, and a sealing agent between said electrode plates, said electrode plates being stuck together through said sealing agent, the improvement wherein said sealing agent comprises an insulating sheet, said negative electrode plate and said insulating sheet have a first hole formed therethrough, said first hole reaching said positive electrode plate, said positive electrode plate has a second hole formed therethrough, said second hole reaching said insulating sheet such that when said positive terminal is passed through said first hole, said positive terminal contacts said positive electrode and said negative terminal contacts said negative electrode plate, and that when said positive terminal is passed through said second hole, said positive terminal contacts said insulating sheet and is insulated from said negative terminal.

5. The paper battery of claim 4 further comprising a positive electrode material attached to said positive electrode plate, a negative electrode material attached to said negative electrode plate, and an insulating separator disposed between said positive and negative electrode materials.

6. The paper battery of claim 5 wherein said electrode material is $MnO_2$ and said negative electrode material is metallic lithium.

* * * * *